United States Patent

Folsom et al.

(10) Patent No.: US 10,781,318 B2
(45) Date of Patent: Sep. 22, 2020

(54) GRAPHENE BASED CORROSION-RESISTANT COATING

(71) Applicant: Hamilton Sundstrand Corporation, Charlotte, NC (US)

(72) Inventors: Michael E. Folsom, Ellington, CT (US); Krystyna Kapalczynski, West Hartford, CT (US); Steven Poteet, Hamden, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 16/185,417

(22) Filed: Nov. 9, 2018

(65) Prior Publication Data

US 2020/0148894 A1 May 14, 2020

(51) Int. Cl.
| | | |
|---|---|---|
| C09D 163/00 | (2006.01) | |
| B05D 1/18 | (2006.01) | |
| B05D 7/14 | (2006.01) | |
| B05D 7/22 | (2006.01) | |
| C09D 5/08 | (2006.01) | |
| C09D 7/40 | (2018.01) | |
| C08K 3/04 | (2006.01) | |

(52) U.S. Cl.
CPC .............. C09D 5/084 (2013.01); B05D 1/18 (2013.01); B05D 7/14 (2013.01); B05D 7/22 (2013.01); C09D 7/70 (2018.01); C09D 163/00 (2013.01); *C08K 3/042* (2017.05); *C08K 3/046* (2017.05); *C08K 2201/011* (2013.01)

(58) Field of Classification Search
None
See application file for complete search history.

(56) References Cited

U.S. PATENT DOCUMENTS

| | | | |
|---|---|---|---|
| 10,023,963 B2 | 7/2018 | Ding et al. | |
| 2011/0245378 A1* | 10/2011 | Russ | C08K 3/042 523/440 |
| 2011/0274835 A1 | 11/2011 | Liu et al. | |
| 2014/0037850 A1* | 2/2014 | Buckley, Jr. | B01J 19/02 427/290 |
| 2014/0147609 A1* | 5/2014 | Ren | C09D 171/08 428/36.91 |
| 2015/0361316 A1* | 12/2015 | Henkenjohann | C09J 5/06 428/416 |
| 2017/0037257 A1 | 2/2017 | Yang et al. | |
| 2017/0354190 A1* | 12/2017 | Cauchy | B60N 2/5635 |
| 2018/0186124 A1 | 7/2018 | Zhao et al. | |
| 2019/0352781 A1* | 11/2019 | Poteet | C23C 28/3455 |

FOREIGN PATENT DOCUMENTS

| | | |
|---|---|---|
| CN | 106147505 A | 11/2016 |
| CN | 107267033 A | 10/2017 |
| EP | 3378903 A1 | 9/2018 |

OTHER PUBLICATIONS

Extended European Search Report for EP Application No. 19208034.9, dated Mar. 30, 2020, 21 pages.

* cited by examiner

*Primary Examiner* — Sheeba Ahmed
(74) *Attorney, Agent, or Firm* — Kinney & Lange, P.A.

(57) ABSTRACT

In one aspect, a coating for protecting a component exposed to a corrosive environment includes an epoxy phenolic resin and graphene nanoplatelets. In another aspect, a method of protecting a an article exposed to a corrosive environment includes applying a corrosion-resistant epoxy phenolic coating to a surface of the article exposed to a corrosive environment and curing the corrosion-resistant epoxy phenolic coating. The coating comprises 0.1 to 2.0 weight percent graphene nanoplatelets containing 5 to 15 atomic percent oxygen.

20 Claims, 2 Drawing Sheets

GRAPHENE BASED CORROSION-RESISTANT COATING

BACKGROUND

The present invention relates generally to coatings and more particularly to corrosion-resistant coatings.

Aluminum aircraft heat exchangers placed in service in areas of the world with significant air pollution can exhibit considerable corrosion caused by sulfuric acid formed by the reaction of sulfur containing pollutants with atmospheric moisture. Currently used barrier coatings have been only partially effective in preventing or reducing this corrosion. Conventional hexavalent chromium-containing wash primers used to improve corrosion resistance have associated environmental and health risks and have shown insufficient results in highly corrosive environments. The addition of multiple barrier coating layers, while capable of delaying corrosion, significantly increases manufacture time and cost. Improved and more environmentally friendly corrosion-resistant coatings are needed to increase component life while improving manufacturing throughput and reducing manufacturing costs.

SUMMARY

In one aspect, a coating for protecting a component exposed to a corrosive environment includes an epoxy phenolic resin and graphene nanoplatelets.

In another aspect, an article for use in a corrosive environment includes a metallic substrate and a corrosion-resistant coating disposed on a surface of the metallic substrate. The corrosion-resistant coating includes an epoxy phenolic resin and graphene nanoplatelets.

In yet another aspect, a method of protecting a an article exposed to a corrosive environment includes applying a corrosion-resistant epoxy phenolic coating to a surface of the article exposed to a corrosive environment and curing the corrosion-resistant epoxy phenolic coating. The coating comprises 0.1 to 2.0 weight percent graphene nanoplatelets containing 5 to 15 atomic percent oxygen.

The present summary is provided only by way of example, and not limitation. Other aspects of the present disclosure will be appreciated in view of the entirety of the present disclosure, including the entire text, claims and accompanying figures.

Figure 1:
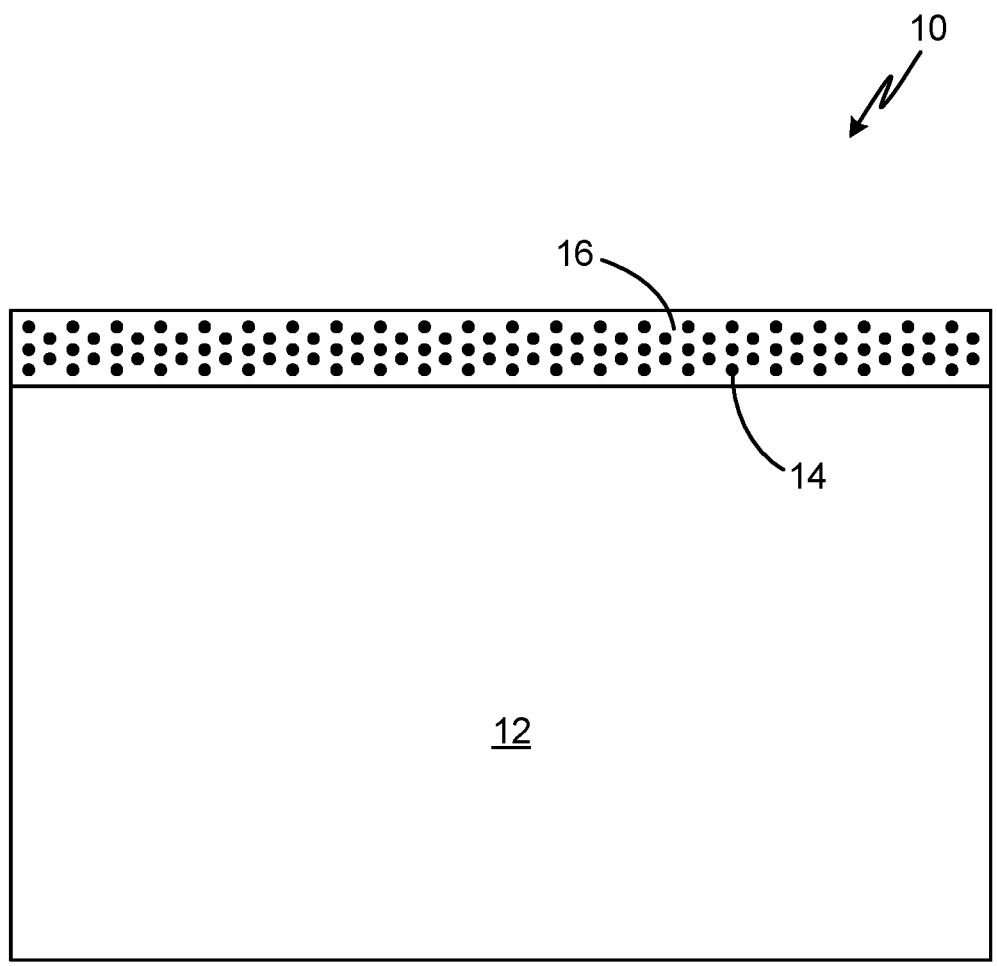
FIG. 1 is a schematic view of a corrosion-resistant coating on an article.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Currently, epoxy phenolic barrier coatings such as Rockhard coatings are used in combination with a hexavalent chromium-containing wash primer to protect metallic aircraft components from corrosion. A surface of the metallic component is deoxidized prior to applying a thin coating of hexavalent chromium-containing wash primer. The primer serves to improve coating adhesion and corrosion protection, but has been shown to provide generally poor corrosion protection in regions of the world with high air pollution. To improve corrosion resistance in highly corrosive environments, multiple layers of the epoxy phenolic coating must be applied to provide barrier protection of the component. The application of multiple coats can significantly reduce manufacturing throughput and increase manufacturing costs, while the use of hexavalent chromium produces toxic environmental waste and can pose a significant health hazard in the manufacturing process.

Graphene nanoplatelets can be combined with an epoxy phenolic solvent-based coating system to provide improved corrosion resistance. The introduction of graphene nanoplatelets can reduce the number of coats needed (i.e., coating thickness) and can eliminate the need for applying a chromate-containing wash primer. FIG. 1 is a schematic view of corrosion-resistant coating 10 on substrate 12. Substrate 12 can be an aircraft component including, but not limited to, heat exchangers, ductwork, valves, or gearbox housings formed from aluminum or magnesium alloys. Coating 10 is an epoxy phenolic coating containing graphene nanoplatelets. As schematically illustrated in FIG. 1, graphene nanoplatelets 14 are dispersed in epoxy phenolic coating matrix 16 comprising an epoxy phenolic resin. A synergistic relationship exists between epoxy phenolic resin 16 and graphene nanoplatelets 14, providing improved corrosion resistance. The phenolic resin is less permeable to water than conventional epoxy bond primer systems and the graphene nanoplatelets 14 exhibit corrosion-resistant properties.

Graphene nanoplatelets 14 can have a diameter within a range of 1 to 20 micrometers and arranged in stacks of less than eight single layer graphene sheets. Generally, nanoplatelets can be clusters of four to five single layer sheets and preferably, can be arranged in stacks of five or less single layer graphene sheets. Nanoplatelet diameters above 20 micrometers can cause the coating to have a rough or lumpy texture due to an orientation of the high aspect ratio graphene nanoplatelets 14 and gaps that form between nanoplatelets 14. Diameters less than one micrometer have an improved aspect ratio, but can increase a viscosity of coating 10 above a level suitable for coating application. Some increase in viscosity is acceptable and in some embodiments can be preferred as a means to increase coating thickness.

Graphene nanoplatelets 14 can be suspended in a solvent (e.g., acetone, isopropanol, or other solvent suitable for mixing with the epoxy phenolic resin) and mixed with the epoxy phenolic resin. Coating 10 can have a total solid content of 30 to 35 percent by weight with a graphene nanoplatelet loading between 0.1 and 1.5 wt % of the total solid content. Graphene nanoplatelet content can be selected to provide acceptable corrosion resistance without adversely affecting coating 10 viscosity and mechanical properties of coating 10 after curing. Graphene nanoplatelets 14 can contain between 5 and 15 atomic percent oxygen in the form of surface functional groups including, but not limited to, hydroxyl units, carboxylic acids, and ketones. In some embodiments, graphene nanoplatelets preferably contain about 15 atomic weight percent oxygen. Alkoxysilanes (i.e., (3-glycidoxypropyl) trimethoxysilane) can be used to functionalize the graphene nanoplatelet side chains, permitting improved mixing with the epoxy phenolic resin. Functional groups can be, for example, amine, amide, carboxylic acid, or epoxide. Graphene nanoplatelets 14 having less than 5 atomic percent oxygen may not mix adequately with the epoxy phenolic resin, while too much oxygen content can inhibit the corrosion-resistant properties of the graphene. Alkoxysilane can be mixed with alcohol and water to catalyze hydrolysis and then introduced to the suspension of graphene nanoplatelets 14.

The functionalized graphene nanoplatelets 14 can then be added to the epoxy phenolic resin 16. Epoxy phenolic resin 16 can be, for example, Rockhard coating (i.e., Rockhard 961-450-002). Graphene nanoplatelets 14 can be sonicated into solution (e.g., 10-20 kHz sonication for 10-15 minutes) to produce coating 10. In addition to dispersing graphene nanoplatelets 14, sonication can separate some clusters of the graphene nanoplatelets into stacks of less than five single layer sheets.

Figure 2:
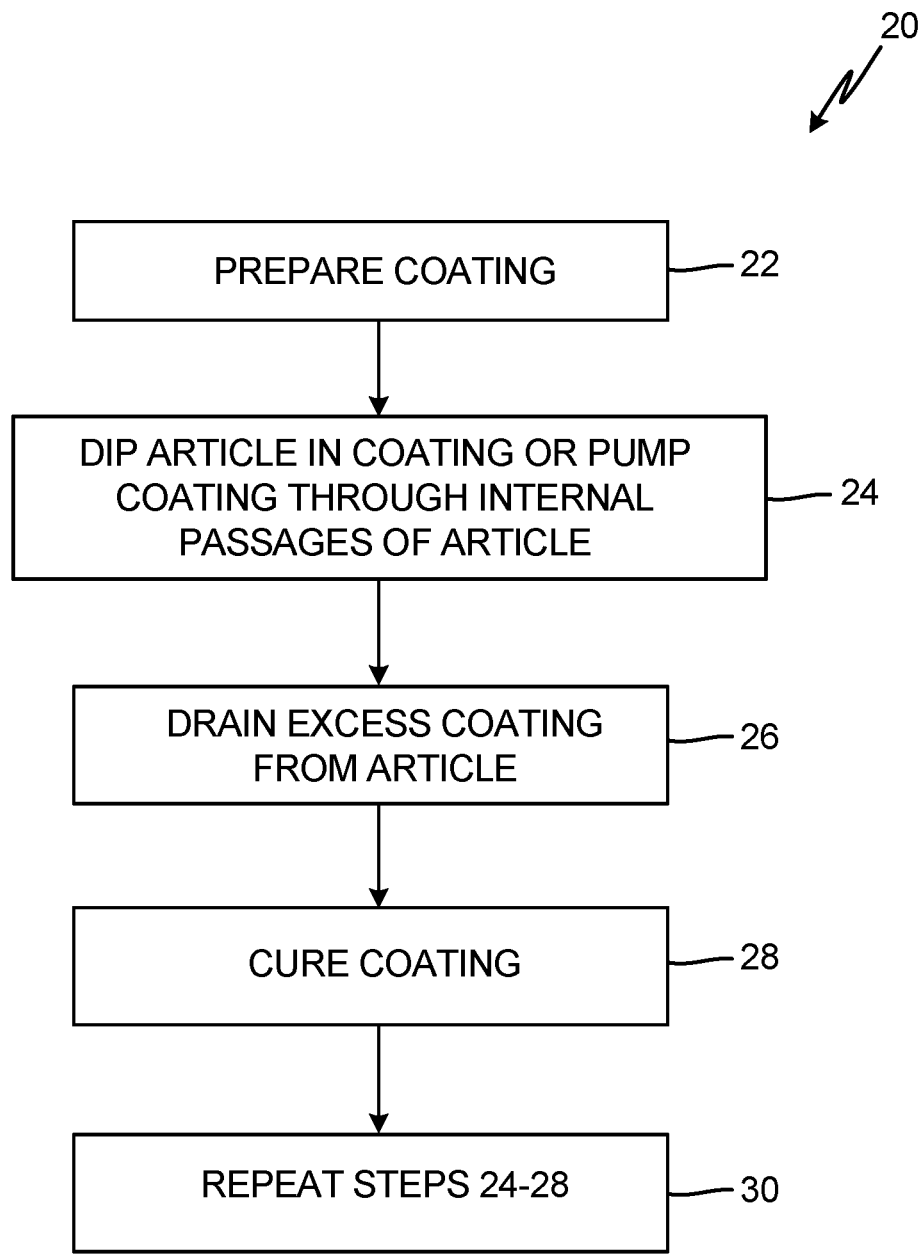
FIG. 2 is a method of applying a corrosion-resistant coating to an article.

FIG. 2 illustrates method 20 of protecting an article exposed to a corrosive environment. As previously disclosed, the article can be a metallic component exposed to a corrosive environment including, but not limited to, aircraft heat exchangers, ductwork, valves, and gearbox housings formed from aluminum or magnesium alloy. Method 20 includes preparing corrosion-resistant epoxy phenolic coating 10 (step 22); dipping the article in coating 10, spraying coating 10 on article surfaces, and/or pumping coating 10 through internal passages of the article (step 24); draining excess coating 10 from internal passages or a surface of the article (step 26); curing coating 10 (step 28); and repeating steps 24-28 until a desired coating thickness is achieved (step 30). As previously disclosed, coating 10 can be prepared by mixing graphene nanoplatelets 14 suspended in a solvent with an alkoxysilane mixture to form functional groups on the surface of graphene nanoplatelets 14, which improve mixing with epoxy phenolic resin 16. A mixture of epoxy phenolic resin 16 and the functionalized graphene nanoplatelets 14 can be sonicated to disperse graphene nanoplatelets 14 throughout the mixture. As previously disclosed, coating 10 can have graphene nanoplatelet loading of between 0.1 and 2.0 of the total solid wt. % to provide coating 10 with acceptable corrosion-resistant properties in an aggressive corrosion environment.

Coating 10 can be applied directly to metallic substrate 12 without a hexavalent chromium-containing primer wash or other primer used to improve adhesion nor limit corrosion. In some embodiments, coating 10 can be applied without deoxidizing the substrate surface. Substrate 12 can be dipped in coating 10 or coating 10 can be sprayed on substrate surfaces. To coat internal surfaces, such as internal heat exchanger surfaces, coating 10 can be pumped through internal passages of the component. In some embodiments, plumbing can be connected to inlets and outlets of the heat exchanger for pumping coating 10 through internal passageways. Such method can be used to coat all internal fins and other heat exchanging structures and surfaces. Excess coating 10 can be drained from internal passages or the surface of the article leaving a layer of coating 10 on the article. Coating 10 can be dried initially at room temperature to remove solvents and then further cured with the addition of heat. In some embodiments, multiple layers of coating 10 can be applied to substrate 12 to achieve a desired coating thickness. Each layer can be partially cured before application of the subsequent layer. After a desired coating thickness is achieved, coating 10 can undergo a final cure and heat treatment. For example, each layer of coating 10 can undergo an initial cure at room temperature for 60 minutes, followed by curing at 220° F. for 45-60 minutes, followed by curing at 350° F. for 60-70 minutes, which can be extended to 8-9 hours in the final cure and heat treatment. For the application of coating 10 to an aluminum alloy heat exchanger (e.g., 6000 series aluminum), coating 10 can have a maximum thickness of about 25.4 micrometers. In another embodiment, coating 10 can have a maximum thickness of 12.7 micrometers, and preferably a thickness of between 7.6 micrometers and 12.7 micrometers to provide adequate protection in corrosive environments. In some embodiments, two layers of coating 10 can be applied to substrate 12 to achieve a coating thickness between 7.6 micrometers and 12.7 micrometers. This is a substantial improvement over barrier coating systems, which can require seven or more layers to achieve a tolerable level of corrosion protection.

The addition of graphene nanoplatelets to an epoxy phenolic solvent-based coating system can provide improved corrosion resistance, while reducing the number of coats needed and eliminating the need for applying a chromate containing wash primer. Improved corrosion resistance increases component life. The reduction in coats applied results in improved manufacturing throughput and reduced manufacturing costs. And the elimination of the hexavalent chromium-containing wash primer makes the manufacturing process, as well as the manufactured article, more environmentally friendly.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A coating for protecting a component exposed to a corrosive environment includes an epoxy phenolic resin and graphene nanoplatelets.

The coating of the preceding paragraph can optionally include, additionally and/or alternatively, any one or more of the following features, configurations, and/or additional components:

A further embodiment of the coating of any of the preceding paragraphs, wherein the coating can comprise 0.1 to 2.0 weight percent graphene nanoplatelets.

A further embodiment of the coating of any of the preceding paragraphs, wherein the graphene nanoplatelets can have a diameter within the range of 1 to 20 micrometers.

A further embodiment of the coating of any of the preceding paragraphs, wherein the nanoplatelets can comprise stacks of less than 8 single layer graphene sheets.

A further embodiment of the coating of any of the preceding paragraphs, wherein the graphene nanoplatelets can contain 5 to 15 atomic percent oxygen.

A further embodiment of the coating of any of the preceding paragraphs, wherein the graphene nanoplatelets can comprise functional groups selected to improve mixing with the epoxy phenolic resin.

An article for use in a corrosive environment includes a metallic substrate and a corrosion-resistant coating disposed on a surface of the metallic substrate. The corrosion-resistant coating includes an epoxy phenolic resin and graphene nanoplatelets.

The article of the preceding paragraph can optionally include, additionally and/or alternatively, any one or more of the following features, configurations, and/or additional components:

A further embodiment of the article of any of the preceding paragraphs, wherein the coating can comprise 0.1 to 2.0 weight percent graphene nanoplatelets.

A further embodiment of the article of any of the preceding paragraphs, wherein the graphene nanoplatelets can have a diameter within the range of 1 to 20 micrometers.

A further embodiment of the article of any of the preceding paragraphs, wherein the nanoplatelets can comprise stacks of less than 8 single layer graphene sheets.

A further embodiment of the article of any of the preceding paragraphs, wherein the graphene nanoplatelets can contain 5 to 15 atomic percent oxygen.

A further embodiment of the article of any of the preceding paragraphs, wherein the graphene nanoplatelets can comprise functional groups selected to improve mixing with the epoxy phenolic resin.

A further embodiment of the article of any of the preceding paragraphs, wherein the substrate can be an aluminum alloy or magnesium alloy.

A further embodiment of the article of any of the preceding paragraphs, wherein the substrate can be a non-deoxidized aluminum alloy or magnesium alloy.

A further embodiment of the article of any of the preceding paragraphs, wherein the article can be a heat exchanger and the surface of the substrate is an internal surface of the heat exchanger.

A further embodiment of the article of any of the preceding paragraphs, wherein the substrate surface can be free of a chromate containing wash primer or chromate containing conversion coat.

A method of protecting a an article exposed to a corrosive environment includes applying a corrosion-resistant epoxy phenolic coating to a surface of the article exposed to a corrosive environment and curing the corrosion-resistant epoxy phenolic coating. The coating comprises 0.1 to 2.0 weight percent graphene nanoplatelets containing 5 to 15 atomic percent oxygen.

The method of the preceding paragraph can optionally include, additionally and/or alternatively, any one or more of the following features, configurations, additional components, and/or steps:

A further embodiment of the method of any of the preceding paragraphs, wherein the surface of the article can be an aluminum alloy or magnesium alloy free of a chromate containing wash primer or chromate containing conversion coat.

A further embodiment of the method of any of the preceding paragraphs, wherein the graphene nanoplatelets can have a diameter within the range of 1 to 20 micrometers.

A further embodiment of the method of any of the preceding paragraphs, wherein the article can be a heat exchanger and wherein applying the coating can comprise pumping the coating through internal passages of the heat exchanger to coat internal surfaces and draining excess coating to leave a coating thickness of less than 12.7 micrometers.

A further embodiment of the method of any of the preceding paragraphs can further comprise repeating the steps of applying the corrosion-resistant epoxy phenolic coating and curing the coating to achieve a coating thickness between 7.6 micrometers and 12.7 micrometers.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A coating for protecting a component exposed to a corrosive environment, the coating comprising: an epoxy phenolic resin; and graphene nanoplatelets, wherein the nanoplatelets are dispersed in the epoxy phenolic resin and wherein the graphene nanoplatelets contain 5 to 15 atomic percent oxygen.

2. The coating of claim 1, wherein the coating comprises 0.1 to 2.0 weight percent graphene nanoplatelets.

3. The coating of claim 2, wherein the graphene nanoplatelets have a diameter within the range of 1 to 20 micrometers.

4. The coating of claim 3, wherein the nanoplatelets comprise stacks of less than 8 single layer graphene sheets.

5. The coating of claim 4, wherein the graphene nanoplatelets contain 5 to 15 atomic percent oxygen.

6. The coating of claim 5, wherein the graphene nanoplatelets comprise functional groups selected to improve mixing with the epoxy phenolic resin.

7. An article for use in a corrosive environment, the article comprising: a metallic substrate; and a corrosion-resistant coating disposed on a surface of the metallic substrate, the corrosion-resistant coating comprising: an epoxy phenolic resin; and graphene nanoplatelets, wherein the nanoplatelets are dispersed in the epoxy phenolic resin and wherein the graphene nanoplatelets contain 5 to 15 atomic percent oxygen.

8. The article of claim 7, wherein the coating comprises 0.1 to 2.0 weight percent graphene nanoplatelets.

9. The article of claim 8, wherein the graphene nanoplatelets have a diameter within the range of 1 to 20 micrometers.

10. The article of claim 9, wherein the nanoplatelets comprise stacks of less than 8 single layer graphene sheets.

11. The article of claim 10, wherein the graphene nanoplatelets contain 5 to 15 atomic percent oxygen.

12. The article of claim 11, wherein the graphene nanoplatelets comprise functional groups selected to improve mixing with the epoxy phenolic resin.

13. The article of claim 12, wherein the substrate is an aluminum alloy or magnesium alloy.

14. The article of claim 13, wherein the substrate surface is free of a chromate containing wash primer or chromate containing conversion coat.

15. The article of claim 13, wherein the article is a heat exchanger and the surface of the substrate is an internal surface of the heat exchanger.

16. A method of protecting an article exposed to a corrosive environment, the method comprising:
   applying a corrosion-resistant epoxy phenolic coating to a surface of the article exposed to a corrosive environment, wherein the epoxy phenolic coating comprises 0.1 to 2.0 weight percent graphene nanoplatelets containing 5 to 15 atomic percent oxygen; and
   curing the corrosion-resistant epoxy phenolic coating.

17. The method of claim 16, wherein the surface of the article is an aluminum alloy or magnesium alloy free of a chromate containing wash primer or chromate containing conversion coat.

18. The method of claim 16, wherein the graphene nanoplatelets have a diameter within the range of 1 to 20 micrometers.

19. The method of claim 18, wherein the article is a heat exchanger and wherein applying the coating comprises:
   pumping the coating through internal passages of the heat exchanger to coat internal surfaces; and
   draining excess coating to leave a coating thickness of less than 12.7 micrometers.

20. The method of claim 18, and further comprising repeating the steps of applying the corrosion-resistant epoxy phenolic coating and curing the coating to achieve a coating thickness between 7.6 micrometers and 12.7 micrometers.

\* \* \* \* \*